United States Patent
Mikawa et al.

(10) Patent No.: US 9,961,310 B2
(45) Date of Patent: *May 1, 2018

(54) IMAGE PROJECTION APPARATUS

(71) Applicant: Ricoh Company, Ltd., Tokyo (JP)

(72) Inventors: Akihisa Mikawa, Kanagawa (JP); Tetsuya Fujioka, Kanagawa (JP); Hideo Kanai, Tokyo (JP); Yasunari Mikutsu, Tokyo (JP); Satoshi Tsuchiya, Kanagawa (JP); Jun Mashimo, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/979,647

(22) Filed: Dec. 28, 2015

(65) Prior Publication Data
US 2016/0198134 A1     Jul. 7, 2016

(30) Foreign Application Priority Data

Jan. 7, 2015   (JP) .................................. 2015-001852

(51) Int. Cl.
*H04N 5/64*   (2006.01)
*H04N 9/31*   (2006.01)
(Continued)

(52) U.S. Cl.
CPC ........... *H04N 9/3152* (2013.01); *G02B 7/005* (2013.01); *G02B 7/1828* (2013.01);
(Continued)

(58) Field of Classification Search
CPC ........................ H04N 9/3185; H04N 9/3188
(Continued)

(56) References Cited

U.S. PATENT DOCUMENTS

| 2005/0168704 A1 | 8/2005 | Gupta et al. |
| 2005/0185408 A1* | 8/2005 | Jin ....................... H04N 9/3114 |
| | | 362/303 |

(Continued)

FOREIGN PATENT DOCUMENTS

| CN | 101093345 A | 12/2007 |
| CN | 101095080 A | 12/2007 |

(Continued)

OTHER PUBLICATIONS

Extended Search Report dated Jun. 8, 2016 in European Patent Application No. 15202740.5.
Chinese Office Action issued in Application No. 2015110359176 dated Mar. 21, 2017 (w/ English translation).

*Primary Examiner* — Michael Lee
*Assistant Examiner* — Omer Khalid
(74) *Attorney, Agent, or Firm* — Oblon, McClelland, Maier & Neustadt, L.L.P.

(57) ABSTRACT

An image projection apparatus that generates an image based on image data and projects the image, includes: an image generation element that uses light emitted from a light source to generate an image; a holding unit that rotatably holds the image generation element; and an illumination optical unit that includes one or more optical systems and a light tunnel that is a tubular member surrounding part of a light path from the light source to the image generation element and reflects the light by an inner surface thereof, and that projects the light passing through the light tunnel toward an entire area of a rotatable range of the image generation element.

5 Claims, 21 Drawing Sheets

(51) Int. Cl.
  *G02B 7/00*    (2006.01)
  *G02B 7/182*   (2006.01)
  *G02B 26/08*   (2006.01)
  *G02B 27/09*   (2006.01)
  *G02B 27/00*   (2006.01)
  *G03B 21/20*   (2006.01)
  *G03B 21/00*   (2006.01)
  *G03B 21/16*   (2006.01)
  *G03B 21/28*   (2006.01)

(52) U.S. Cl.
  CPC ..... *G02B 26/0833* (2013.01); *G02B 27/0068* (2013.01); *G02B 27/0994* (2013.01); *G03B 21/208* (2013.01); *H04N 9/3102* (2013.01); *H04N 9/317* (2013.01); *H04N 9/3114* (2013.01); *G03B 21/008* (2013.01); *G03B 21/16* (2013.01); *G03B 21/28* (2013.01)

(58) Field of Classification Search
  USPC ............................................ 348/745; 353/85
  See application file for complete search history.

(56) References Cited

U.S. PATENT DOCUMENTS

| | | |
|---|---|---|
| 2005/0195504 A1 | 9/2005 | Von Poncet et al. |
| 2006/0146015 A1 | 7/2006 | Buchmann |
| 2011/0019157 A1* | 1/2011 | He .................. G02B 7/005 |
| | | 353/33 |
| 2011/0019457 A1 | 1/2011 | He |
| 2014/0072158 A1* | 3/2014 | Yamada ............. G03B 21/14 |
| | | 381/333 |
| 2014/0375966 A1 | 12/2014 | Mikawa et al. |
| 2014/0375967 A1 | 12/2014 | Mikawa et al. |
| 2015/0092165 A1 | 4/2015 | Mikawa et al. |
| 2015/0198870 A1 | 7/2015 | Mikawa et al. |

FOREIGN PATENT DOCUMENTS

| | | |
|---|---|---|
| EP | 1 746 823 A1 | 1/2007 |
| EP | 1 871 118 A2 | 12/2007 |
| JP | 2012-163732 | 8/2012 |

* cited by examiner

IMAGE PROJECTION APPARATUS

CROSS-REFERENCE TO RELATED APPLICATIONS

The present application claims priority to and incorporates by reference the entire contents of Japanese Patent Application No. 2015-001852 filed in Japan on Jan. 7, 2015.

BACKGROUND OF THE INVENTION

1. Field of the Invention

The present invention relates to an image projection apparatus.

2. Description of the Related Art

Conventionally, an image projection apparatus (e.g., projector) for projecting an image onto a screen or the like is known (see, for example, Japanese Patent Application Laid-open No. 2012-163732). Some of image projection apparatuses generate an image based on image data transmitted from a personal computer, a digital camera, or the like and project the image. Some of the image projection apparatuses generate an image using a light modulation element (image generation element).

The light modulation element modulates light emitted from a light source based on an image signal to generate an image. To prevent uneven illuminance or the like, it is desirable that an illuminance distribution of the light projected to the light modulation element is uniform. Therefore, some of image projection apparatuses using the light modulation element are provided with a light tunnel between an image forming element and a light source. The light tunnel makes uniform the intensity of light to be projected.

The light tunnel is generally designed to match an aspect ratio of a projection image. In other words, when the aspect ratio of the projection image is 4:3, the light tunnel is also designed so that its cross-sectional shape is a rectangle whose aspect ratio is 4:3.

However, the design of the light tunnel is based on an assumption that a relative position between the light tunnel and the light modulation element is unchanged, and therefore it is not suitable for a case in which the relative position changes. In other words, if the relative position between the light tunnel and the light modulation element changes, part of the light modulation element deviates from an area illuminated with the light having passed through the light tunnel. In this case, because the part of the light modulation element that deviates from the illumination area cannot take part in image generation, a problem, such as so-called vignetting, occurs.

In view of the above-described conventional problems, there is a need to provide an image projection apparatus capable of using the entire surface of an light modulation element that fits in an illumination area without any trouble even if a relative position between the light modulation element and a light tunnel changes due to, for example, rotation of the light modulation element by a predetermined angle.

SUMMARY OF THE INVENTION

It is an object of the present invention to at least partially solve the problems in the conventional technology.

According to exemplary embodiments, there is provided an image projection apparatus that generates an image based on image data and projects the image, comprising: an image generation element that uses light emitted from a light source to generate an image; a holding unit that rotatably holds the image generation element; and an illumination optical unit that includes one or more optical systems and a light tunnel that is a tubular member surrounding part of a light path from the light source to the image generation element and reflects the light by an inner surface thereof, and that projects the light passing through the light tunnel toward an entire area of a rotatable range of the image generation element.

The above and other objects, features, advantages and technical and industrial significance of this invention will be better understood by reading the following detailed description of presently preferred embodiments of the invention, when considered in connection with the accompanying drawings.

DESCRIPTION OF THE PREFERRED EMBODIMENTS

Figure 1:
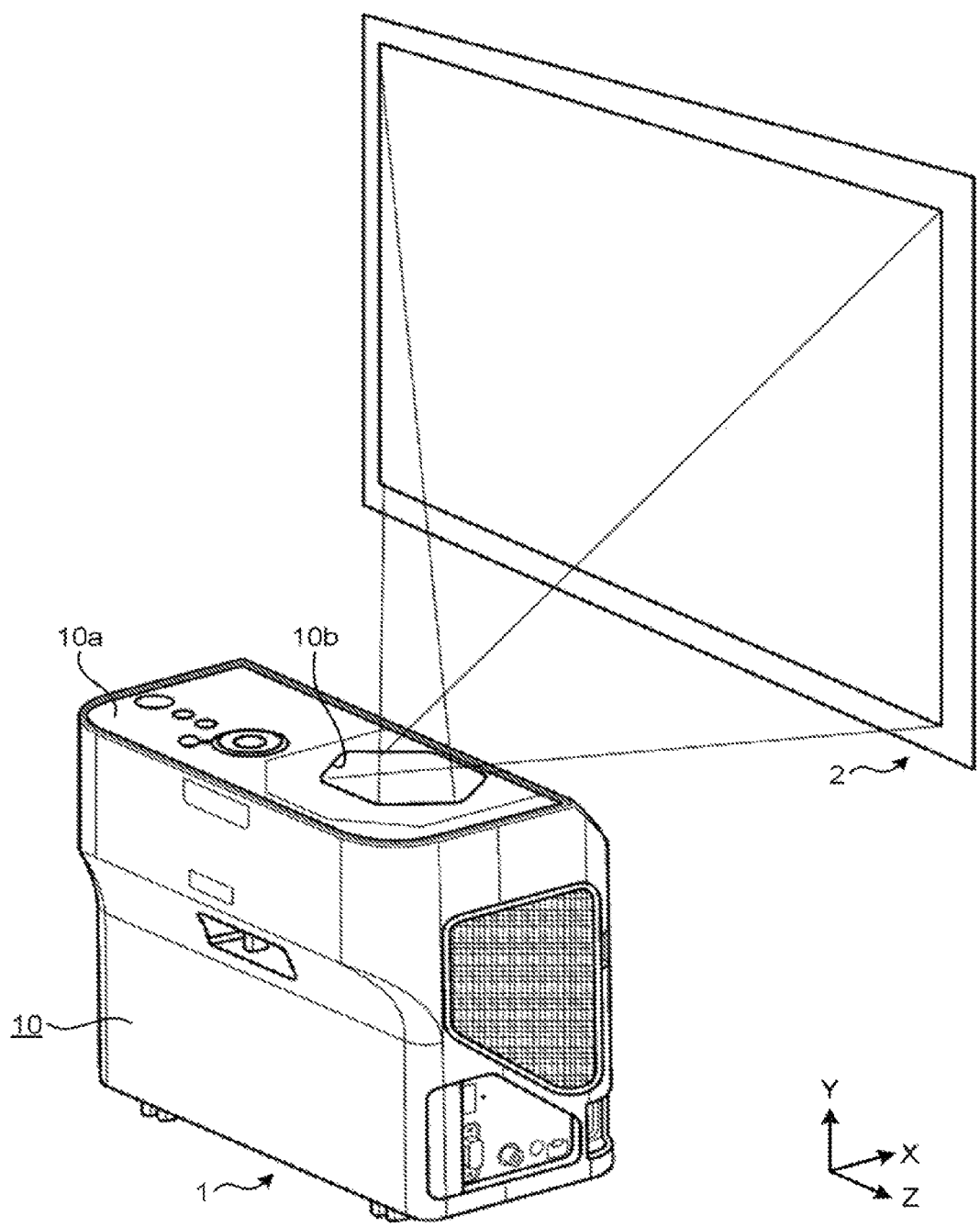
FIG. 1 is a perspective view of a use state of an image projection apparatus according to an embodiment of the present invention.

FIG. 1 is a perspective view of a use state of a projector (image projection apparatus) 1 according to an embodiment. The projector 1 projects an image onto a screen 2. The screen 2 is generally a white rectangular curtain, and reflects a projected image.

Figure 2:
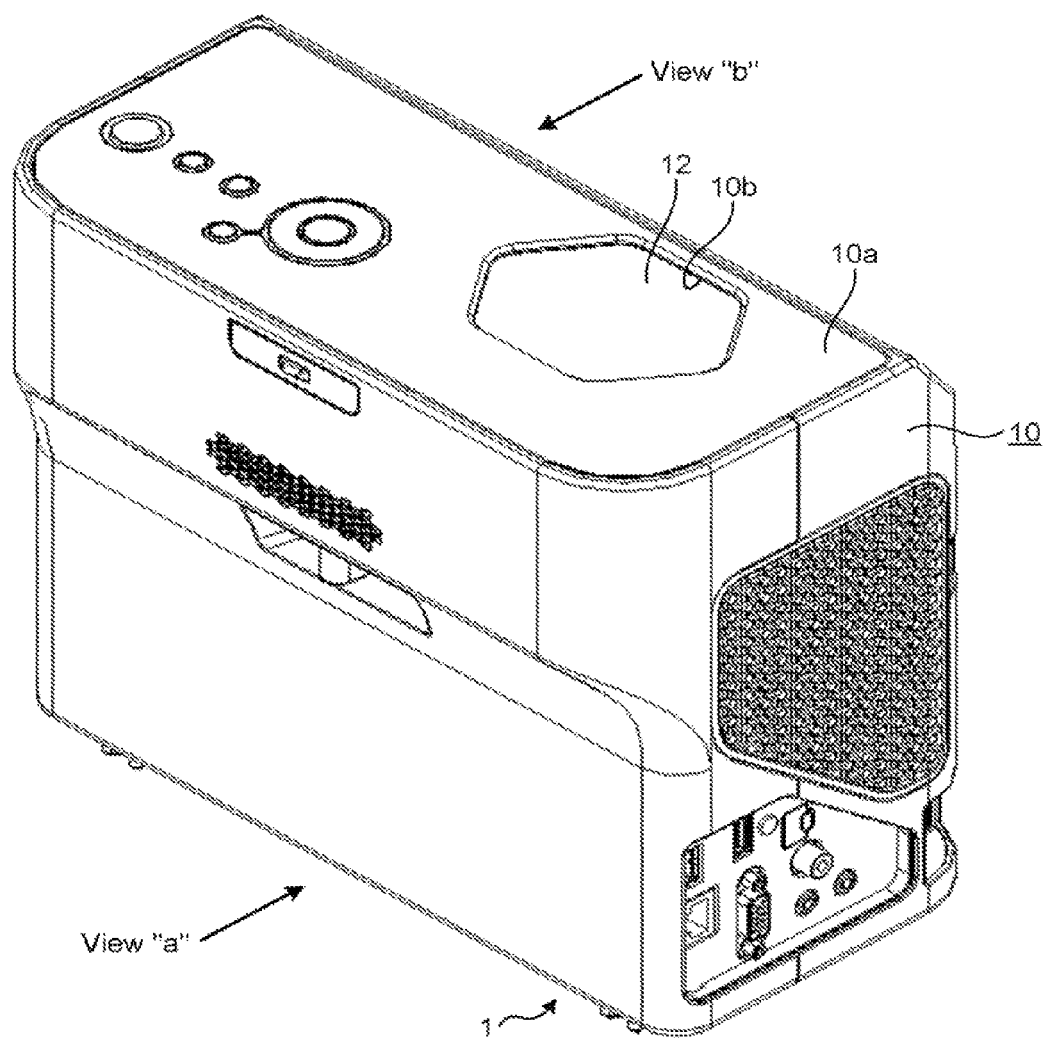
FIG. 2 is a perspective view of an appearance of the image projection apparatus according to the embodiment.

FIG. 2 is a perspective view of an appearance of the projector 1. The projector 1 has a projection window 10b on a top surface 10a of a housing 10. The projector 1 projects the light from the projection window 10b to project an image onto the screen 2.

Figure 3:
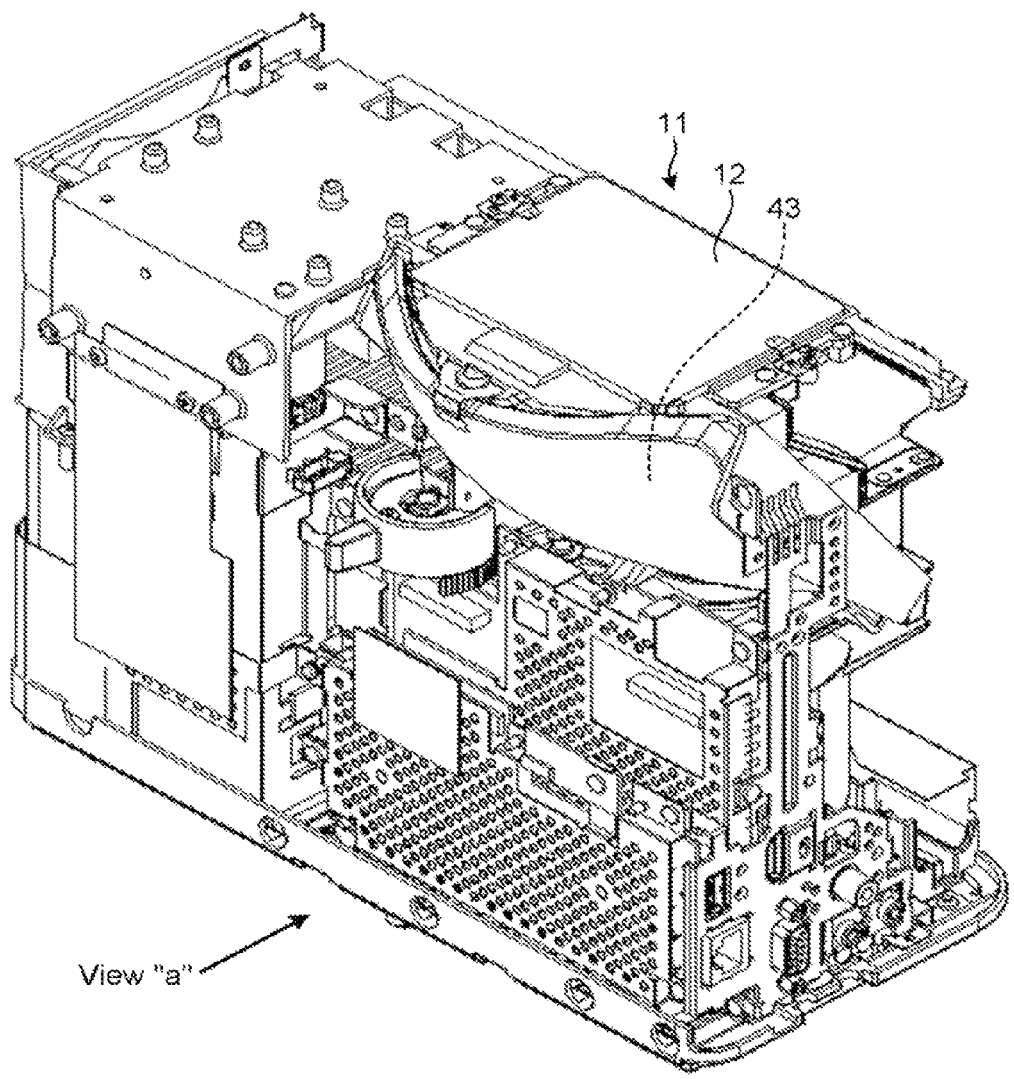
FIG. 3 is a perspective view of an internal configuration of the image projection apparatus according to the embodiment except a housing, which corresponds to view "a" in FIG. 2.
Figure 4:
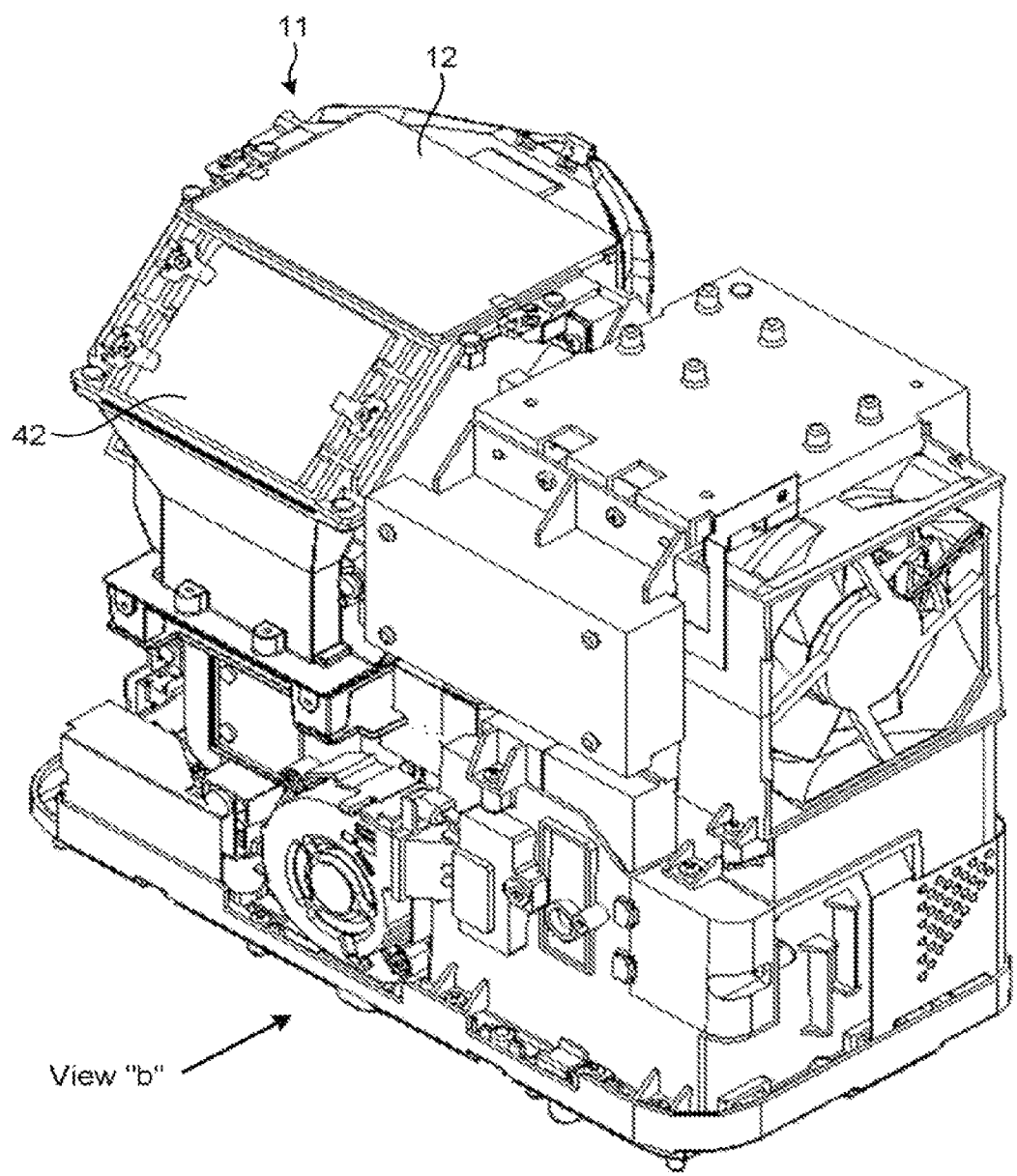
FIG. 4 is a perspective view of an internal configuration of the image projection apparatus according to the embodiment except the housing, which corresponds to view "b" in FIG. 2.

FIG. 3 and FIG. 4 are perspective views of an internal configuration of the projector 1 except the housing 10, in which FIG. 3 corresponds to view "a" in FIG. 2 and FIG. 4 corresponds to view "b" in FIG. 2.

The projector 1 includes an optical engine 11. The optical engine 11 is stored in a position corresponding to an area under the projection window 10b in the housing 10. Provided on the top of the optical engine 11 is a projection glass 12 which is a portion exposing from the projection window 10b.

Figure 5:
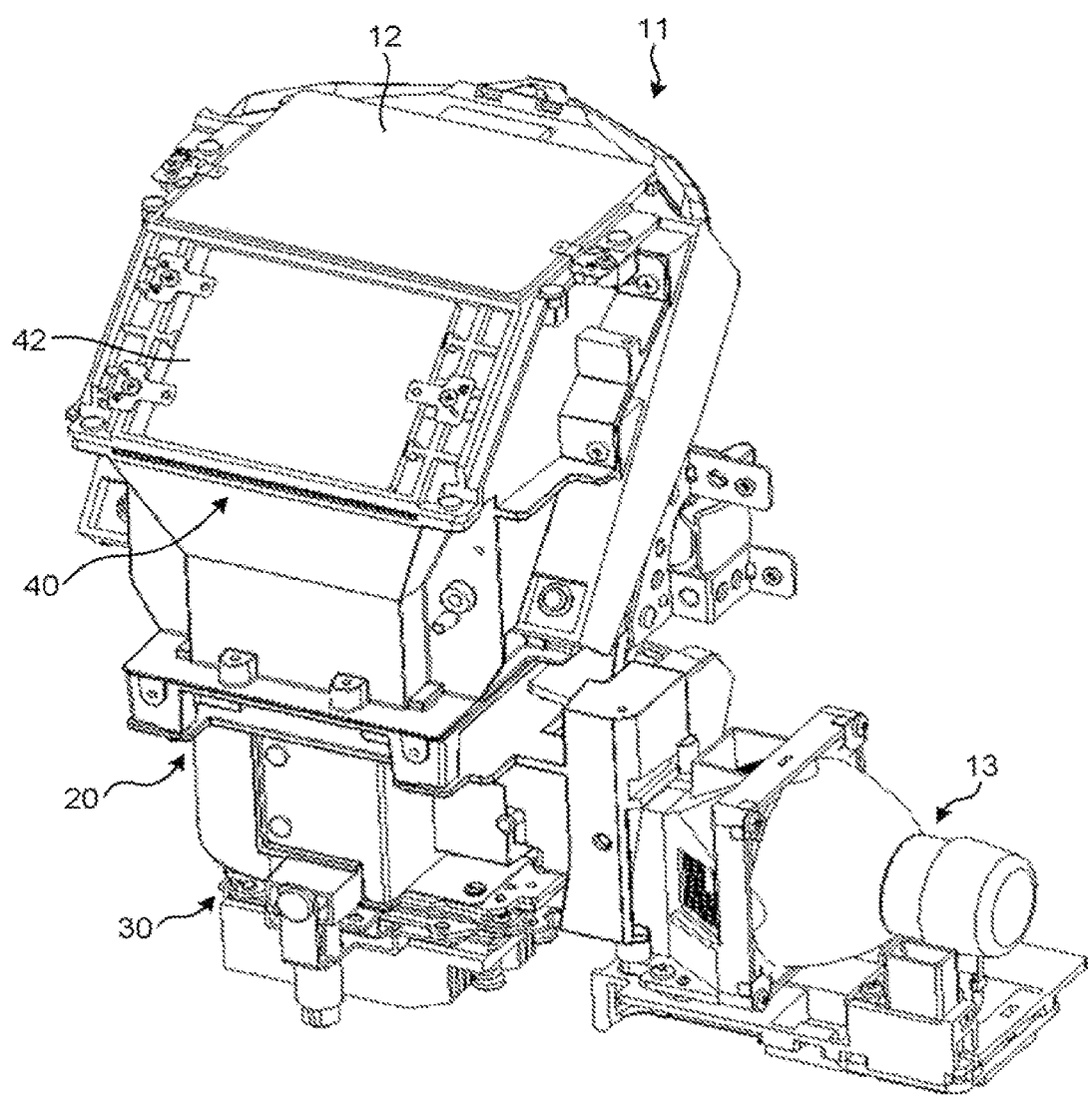
FIG. 5 is a perspective view of an appearance of an optical engine and its surrounding part according to the embodiment.

FIG. 5 is a perspective view of an appearance of the optical engine 11 and its surrounding part. The projector 1 includes a light source unit 13 in the housing 10. The optical engine 11 includes an illumination optical system unit (illumination optical unit) 20, an image display unit (image generating unit) 30, a projection optical system unit (projection optical unit) 40, and the like. These units are superposed from bottom to top in the order of the image display unit 30, the illumination optical system unit 20, and the projection optical system unit 40. The light source unit 13 is arranged adjacent to the illumination optical system unit 20.

The light source unit 13 functions as a light source that emits light, and supplies the light to the image display unit 30 through the illumination optical system unit 20. The illumination optical system unit 20 adjusts the light emitted from the light source unit 13 to be an appropriate state and guides the light to the image display unit 30. The image display unit 30 uses the light emitted from the light source to generate an image based on image data. The projection optical system unit 40 appropriately enlarges the image generated by the image display unit 30 and projects the image onto the screen 2.

Figure 6:
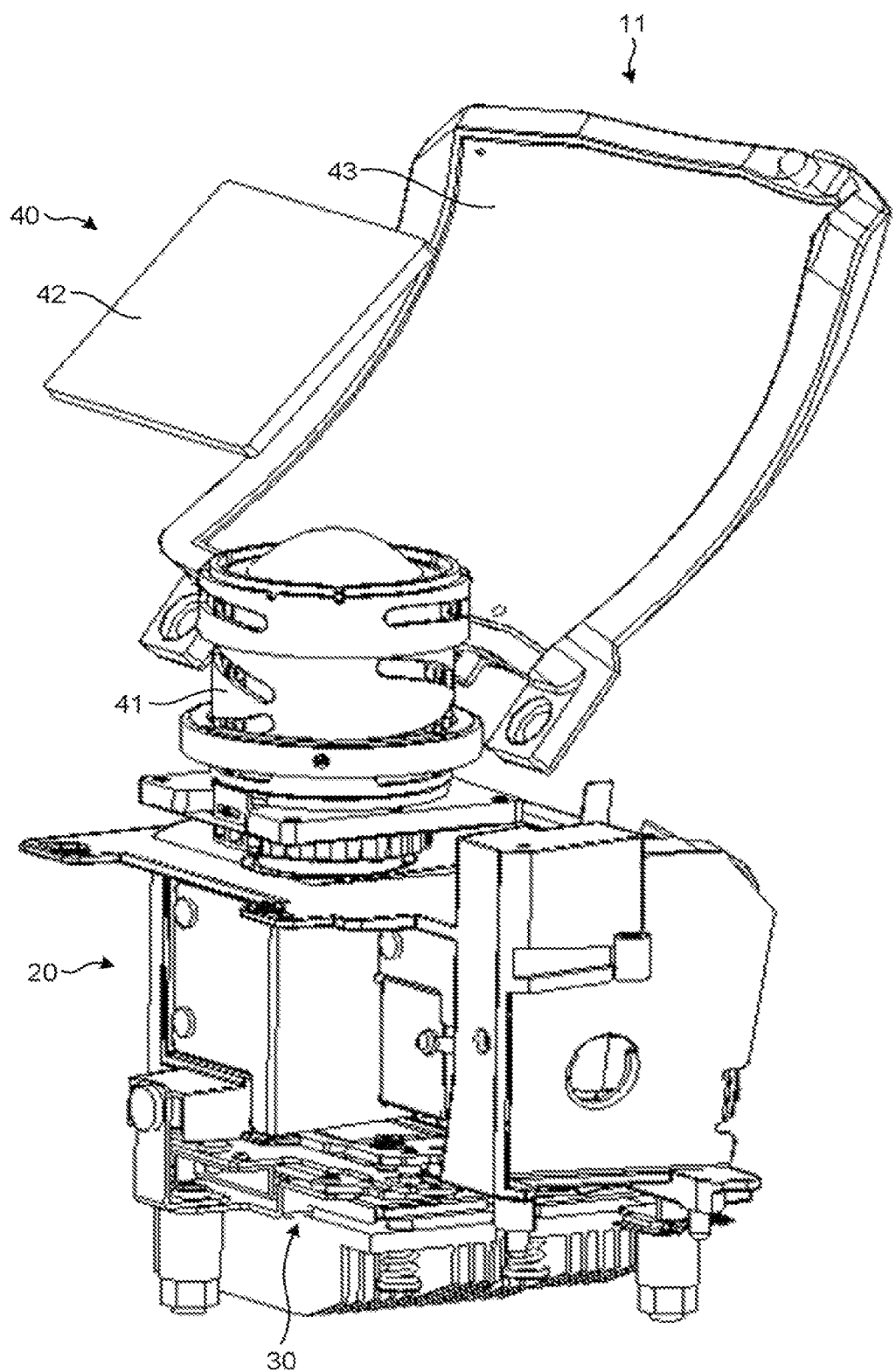
FIG. 6 is a perspective view of a configuration of the optical engine according to the embodiment.

FIG. 6 is a perspective view of a configuration of the optical engine 11 and the projection optical system unit 40. The projection optical system unit 40 includes a projection lens 41, a reflecting mirror 42, a free-curved surface mirror 43, and the like.

The projection lens 41 is located above the image display unit 30. The reflecting mirror 42 is located above the projection lens 41 and its mirror surface faces a back side and a downward direction. The "back side" mentioned here indicates the opposite side when the side of the projector 1 facing the screen 2 is a front side. The free-curved surface mirror 43 is located behind the reflecting mirror 42, and the mirror surface forming the free-curved surface faces frontward.

Figure 7:
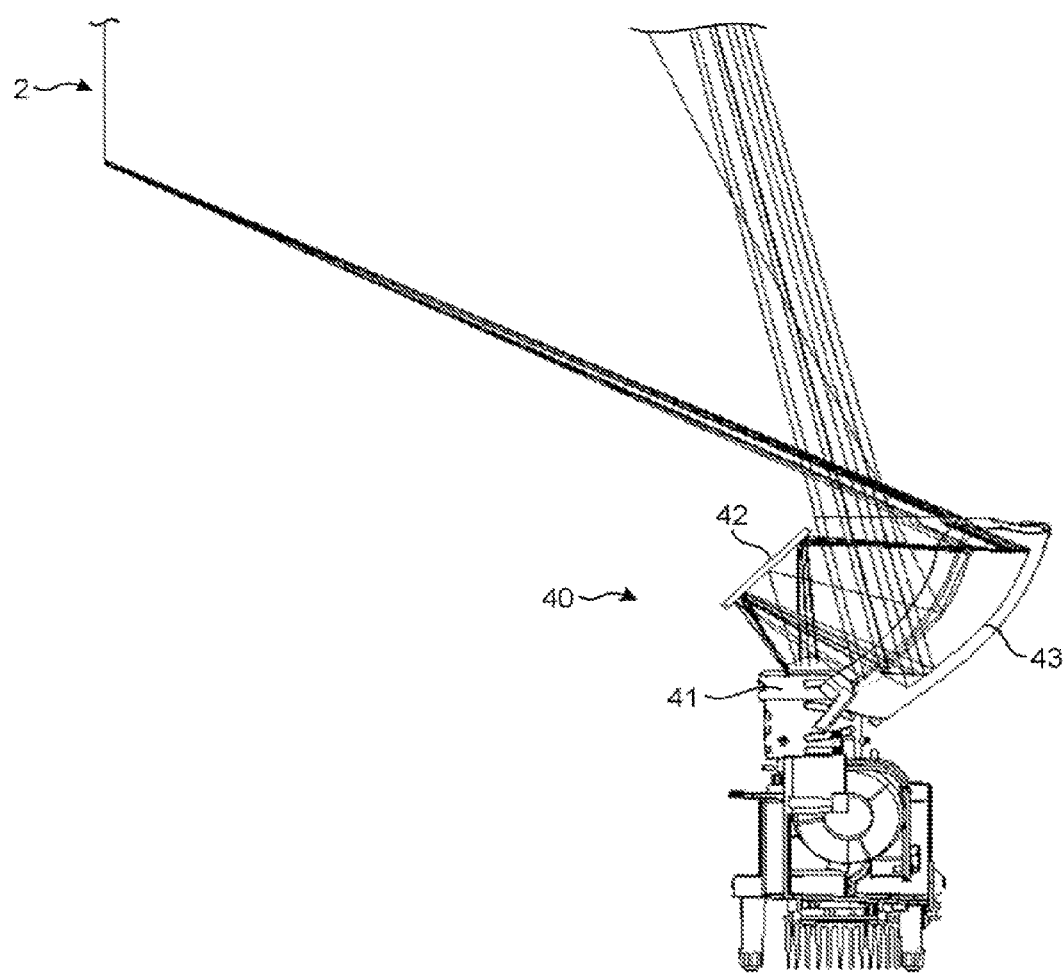
FIG. 7 is a diagram of how a projection optical unit according to the embodiment projects an image onto a screen.

FIG. 7 is a diagram of how the projection optical system unit 40 projects an image onto the screen 2. The projection lens 41 receives the light (image) from the image display unit 30 and guides it to the reflecting mirror 42. The reflecting mirror 42 reflects the light (image) received from the projection lens 41 and guides it to the free-curved surface mirror 43. The free-curved surface mirror 43 enlarges the light (image) received from the reflecting mirror 42 and projects it onto the screen 2.

Figure 8:
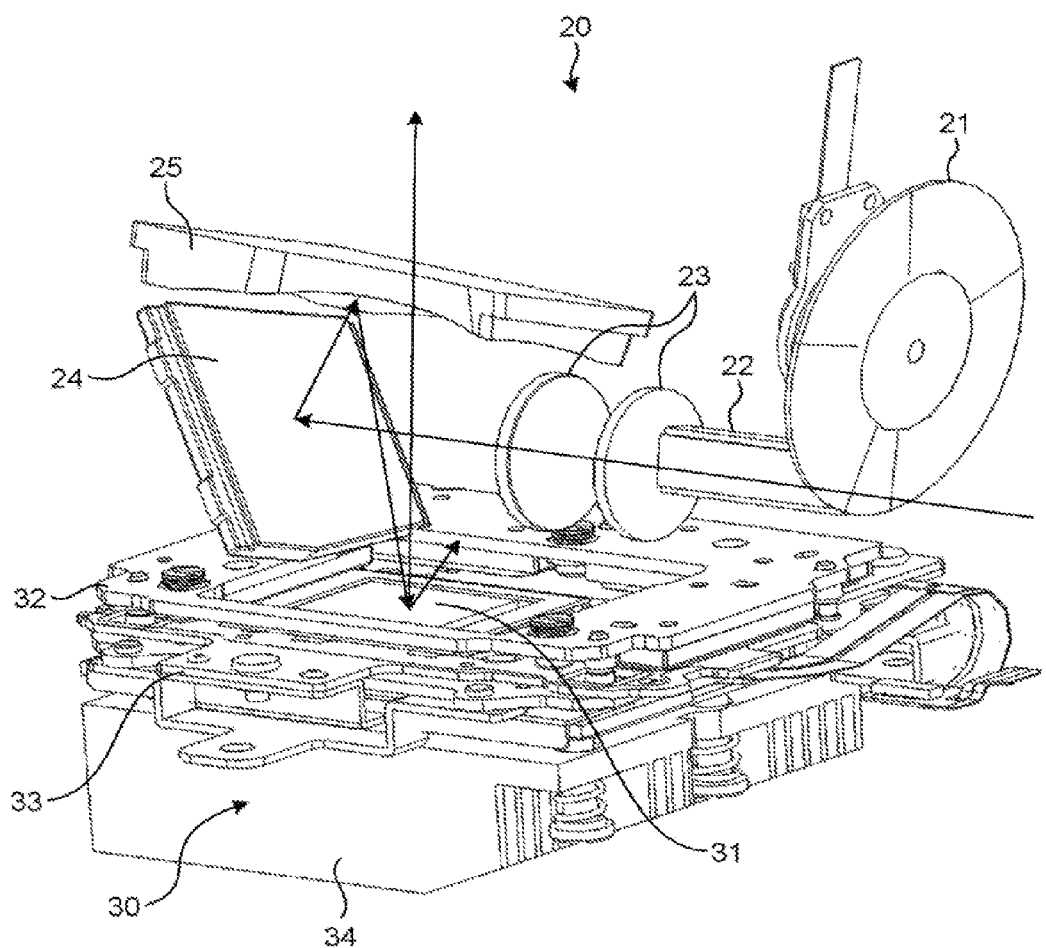
FIG. 8 is a perspective view of a configuration of an illumination optical unit according to the embodiment.
Figure 9:
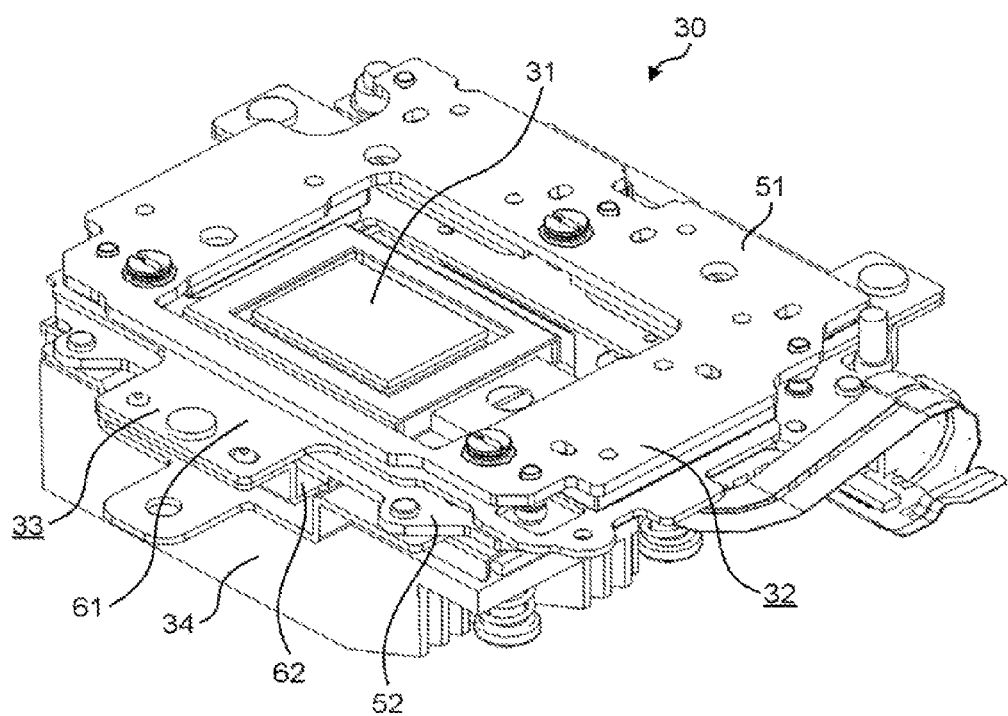
FIG. 9 is a perspective view of a configuration of an image generating unit according to the embodiment.

FIG. 8 is a perspective view of a configuration of the illumination optical system unit 20. FIG. 9 is a perspective view of a configuration of the image display unit 30. The illumination optical system unit 20 includes a color wheel 21, a light tunnel 22, a relay lens 23, a cylinder mirror 24, a concave mirror 25, and the like. The image display unit 30 includes a DMD (Digital Micromirror Device) 31, a fixing unit 32, a movable unit 33, a heat sink 34, and the like.

The color wheel 21 is a disk in which filters of colors of R(Red), G (Green), and B (Blue) are arranged in different portions in, for example, a circumferential direction. The color wheel 21 is made to rotate in a high speed to divide the light emitted from the light source unit 13 into the RGB colors in a time division manner.

The light tunnel 22 is an optical component for making uniform an intensity distribution of the light emitted from the light source unit 13. More specifically, the light tunnel 22 is a glass that is a tube surrounding part of a light path from the light source unit 13 to the DMD 31 and of which inner surface reflects the light. The light tunnel 22 makes the light intensity distribution uniform through multiple reflections of the light of the RGB colors, which pass through the color wheel 21, by the inner surface, and guides the light to the relay lens 23.

The relay lens 23 converges the light emitted from the light tunnel 22 while correcting a chromatic aberration on the axis of the light. The cylinder mirror 24 and the concave mirror 25 reflect the light emitted from the relay lens 23 to be guided to the DMD 31.

The DMD 31 is an example of an image generation element (also called an image display element or a light modulation element). The DMD 31 modulates the reflected light from the concave mirror 25 to generate a projection image. More specifically, the DMD 31 has a rectangular image generation plane in which a plurality of movable micromirrors are arranged in a matrix. Each of the micromirrors in the DMD 31 is provided so that its mirror surface is tiltable, and is ON/OFF driven based on an image signal transmitted from an image control unit (not illustrated).

The projector 1 includes CPU (Central Processing Unit), ROM (Read Only Memory), RAM (Random Access Memory), and the like (all of them are not illustrated). The CPU loads a program stored in the ROM into the RAM to execute the program, so that various modules such as the image control unit are implemented. The image control unit generates an image signal based on image data and transmits the generated signal to the DMD 31. The image data is received from an external device (e.g., personal computer or a digital camera).

For example, in the case of "ON", an inclination angle of the micromirror is controlled so as to reflect the light emitted from the light source unit 13 to the projection optical system unit 40. For example, in the case of "OFF", an inclination angle of the micromirror is controlled so as to reflect the light emitted from the light source unit 13 to an OFF light plate (not illustrated).

In this way, the DMD 31 is configured to control the inclination angle of each micromirror by the image signal transmitted from the image control unit and modulate the light emitted from the light source unit 13 and passing through the illumination optical system unit 20 to generate a projection image.

The movable unit 33 is movable with respect to the fixing unit 32 within a predetermined range. The fixing unit 32 supports the movable unit 33 and also assists movement of the movable unit 33. The movable unit 33 is an example of a holding unit. The movable unit 33 movably holds the DMD 31 in a predetermined movable range. The movable unit 33 rotatably holds the DMD 31 in a predetermined rotatable range (or an angular range).

The heat sink 34 is an example of a heat radiating unit, and at least part of which is in contact with the DMD 31. The heat sink 34 suppresses an increase in temperature of the DMD 31, so that occurrence of troubles such as a malfunction or a failure due to the increase in the temperature of the DMD 31 is reduced.

Figure 10:
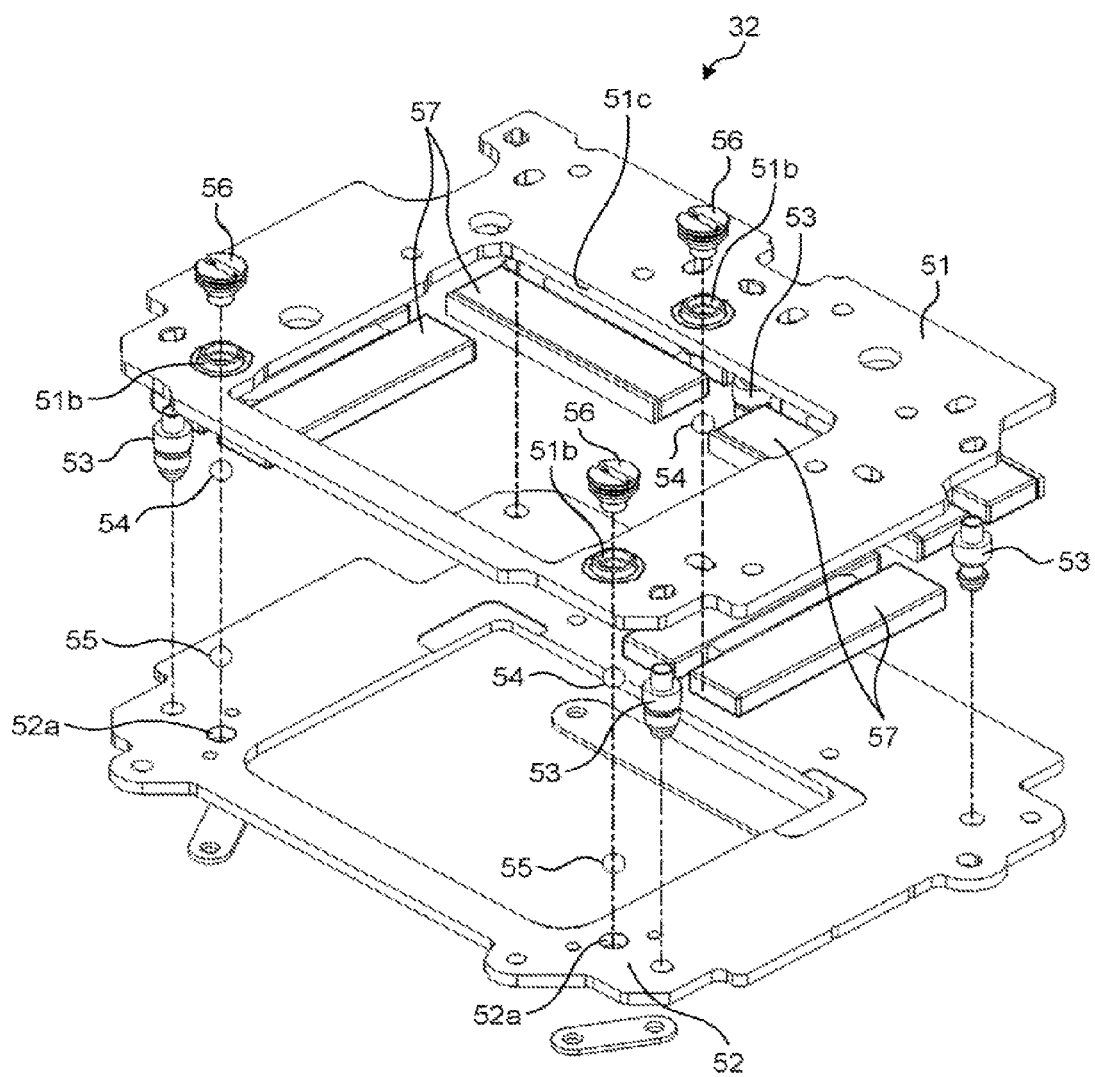
FIG. 10 is a perspective view of a configuration of a fixing unit according to the embodiment.

FIG. 10 is a perspective view of a configuration of the fixing unit 32. The fixing unit 32 includes a top plate 51, a base plate 52, a support 53, spheres 54 and 55, an adjusting screw 56, a magnet 57, and the like.

Figure 11:
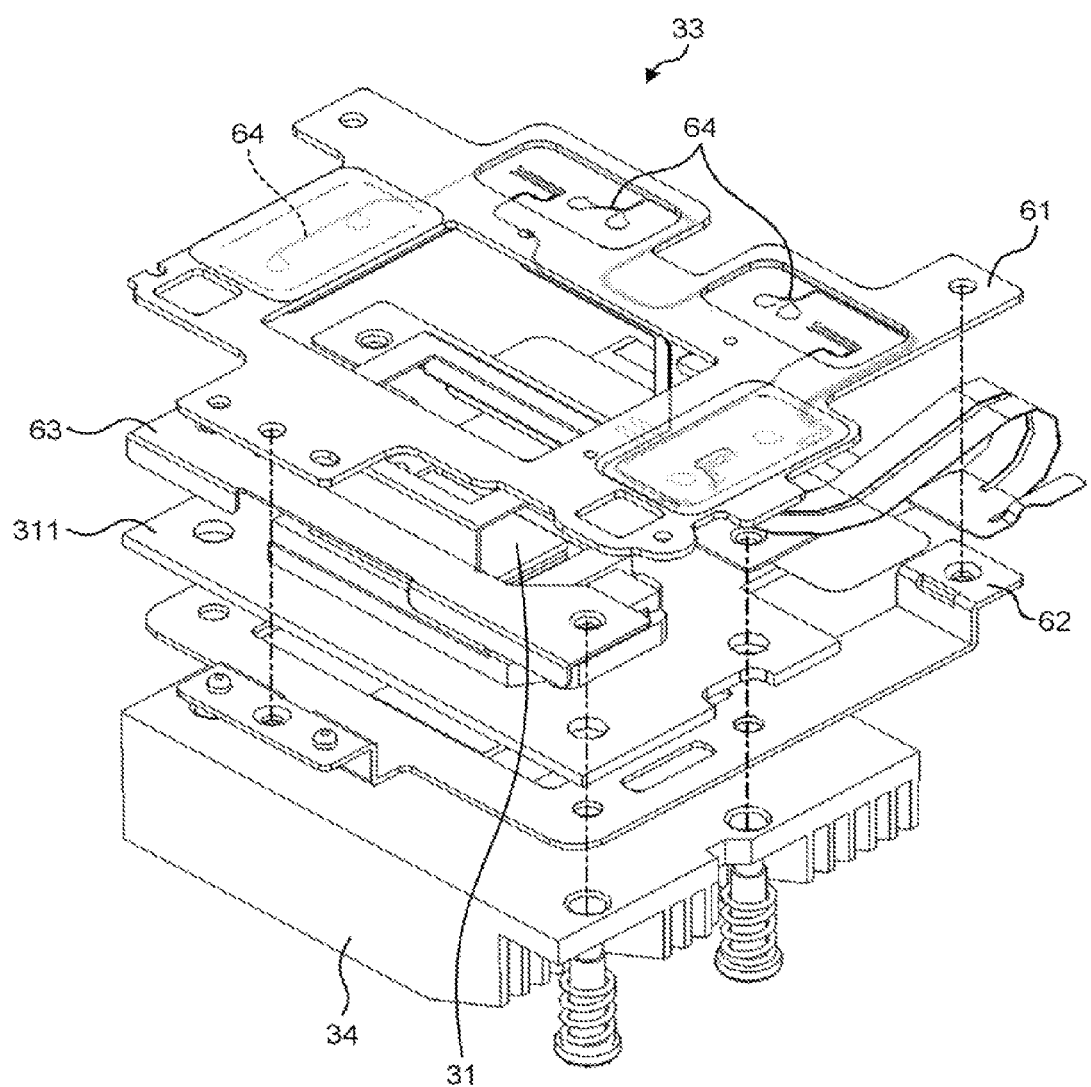
FIG. 11 is a perspective view of a configuration of a movable unit according to the embodiment.

FIG. 11 is a perspective view of a configuration of the movable unit 33. The movable unit 33 includes a movable plate 61, a coupling plate 62, a DMD bracket 63, a coil 64, and the like. The DMD 31 is provided on a DMD substrate 311.

Figure 12:
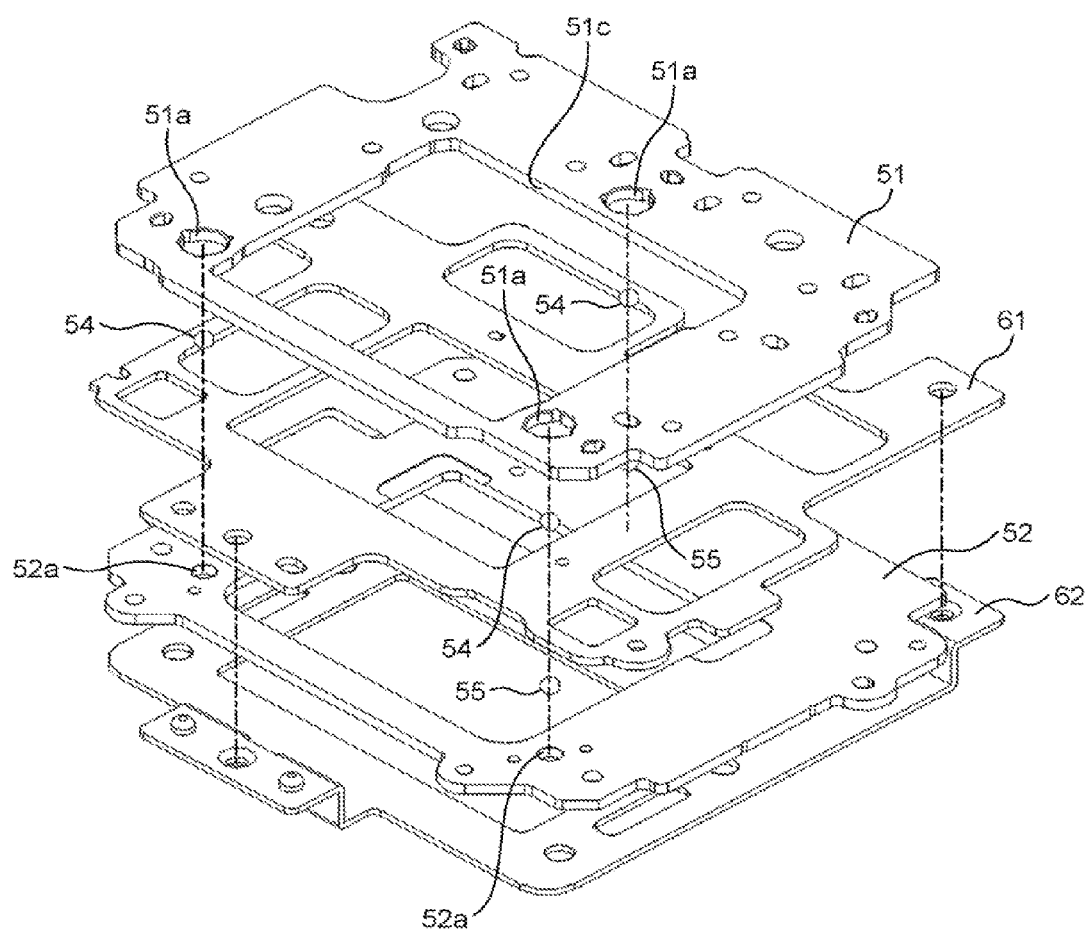
FIG. 12 is a perspective view of how the fixing unit and the movable unit according to the embodiment are superposed.

FIG. 12 is a perspective view of how the fixing unit 32 and the movable unit 33 are superposed. Various types of plate members (the top plate 51, the base plate 52, the movable plate 61, and the coupling plate 62) that are provided in the fixing unit 32 and the movable unit 33 are superposed from bottom to top in the order of the coupling plate 62, the base plate 52, the movable plate 61, and the top plate 51.

The support 53 is positioned at three locations between the top plate 51 and the base plate 52 to form a predetermined interval therebetween, and supports the top plate 51 and the base plate 52 in parallel.

The top plate 51 has a supporting hole 51a (see FIG. 12) at three locations surrounding a central hole 51c. A holding member 51b is inserted into the supporting hole 51a (see FIG. 10). The holding member 51b is a cylindrical member having a female screw groove in its inner peripheral surface.

The holding member 51b holds the adjusting screw 56 so as to be capable of stopping at any screw-in depth by the frictional force between screw grooves.

The base plate 52 has a supporting hole 52a (see FIG. 10 and FIG. 12) at three locations corresponding to the supporting holes 51a.

The sphere 54 is positioned between an edge of the adjusting screw 56 and the movable plate 61. The sphere 55 is positioned between the movable plate 61 and the supporting hole 52a. At least part of the respective sphere 54 and sphere 55 protrudes from the supporting hole 51a and the supporting hole 52a toward the movable plate 61 side and is in contact with the movable plate 61. Thus, the spheres 54 and 55 support the movable plate 61 movably with respect to the top plate 51 and the base plate 52.

The adjusting screw 56 changes the amount of protrusion of the sphere 54 by changing the screw-in depth, thus changing the interval between the top plate 51 and the movable plate 61.

The coupling plate 62 is fixed to the movable plate 61 with the base plate 52 therebetween. The DMD substrate 311 is fixed to the top side of the coupling plate 62, and the heat sink 34 is fixed to the lower side thereof.

The DMD bracket 63 is positioned so as to surround the DMD 31, and the DMD substrate 311 is inserted between the DMD bracket 63 and the coupling plate 62. Thus, the DMD 31 is fixed to the coupling plate 62.

The magnet 57 is provided at four locations so as to surround the central hole 51c of the top plate 51. Each of the magnets 57 forms an electric field that extends to the movable plate 61.

The coil 64 is provided at each position opposing the magnet 57 on the top side of the movable plate 61. The magnet 57 and the opposed coil 64 constitute a moving unit for moving the movable plate 61.

When a current is made to flow in the coil 64, a Lorentz force that becomes a drive force for moving the movable plate 61 is produced by the magnetic field formed by the magnet 57.

The movable plate 61 is linearly or rotatably displaced on the XY plane with respect to the top plate 51 in response to the Lorentz force produced between the magnet 57 and the coil 64

Figure 13:
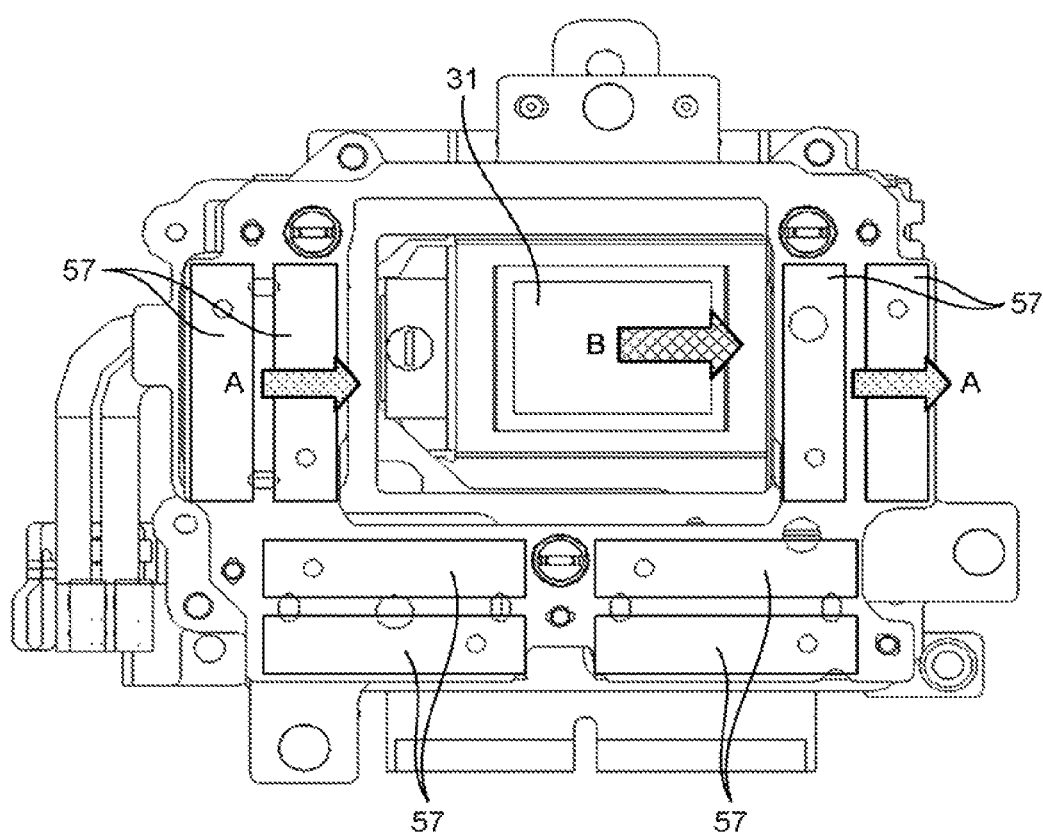
FIG. 13 is a plan view illustrating a direction of a Lorentz force to be produced when DMD according to the embodiment is horizontally moved.
Figure 14:
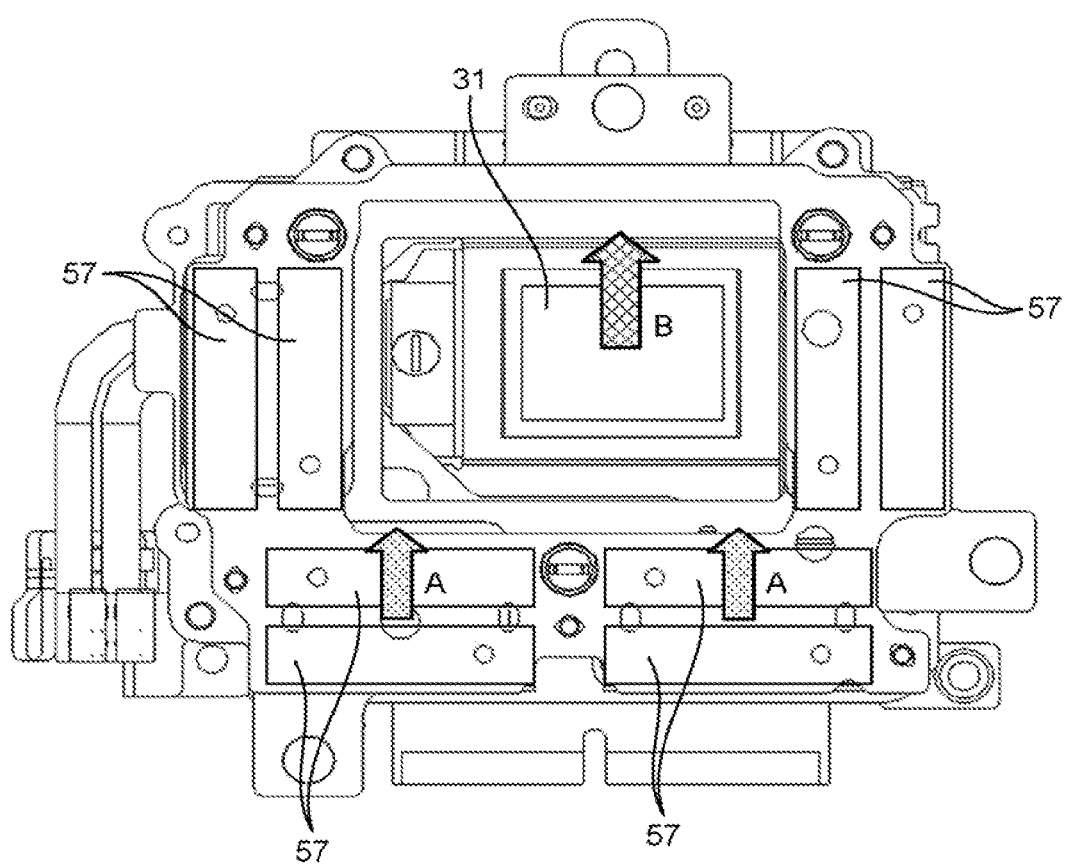
FIG. 14 is a plan view illustrating a direction of a Lorentz force to be produced when the DMD according to the embodiment is vertically moved.
Figure 15:
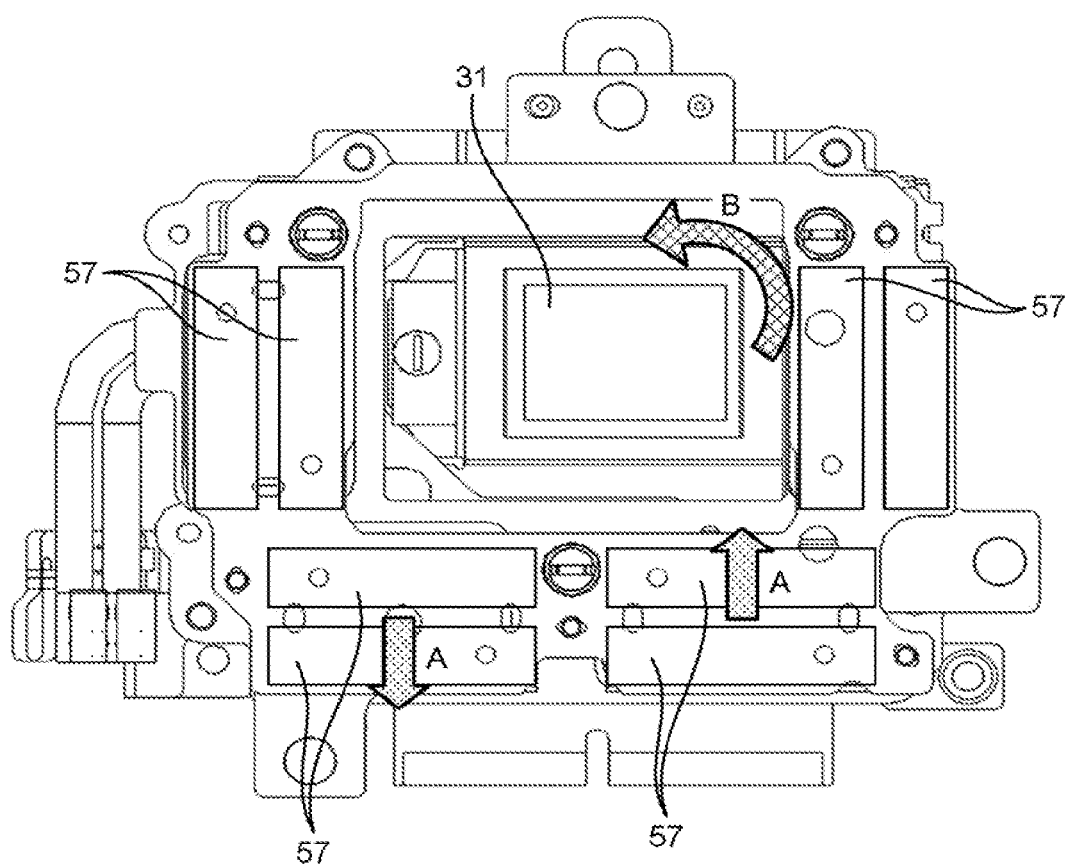
FIG. 15 is a plan view illustrating a direction of a Lorentz force to be produced when the DMD according to the embodiment is rotated.

FIG. 13 is a plan view illustrating the direction of a Lorentz force to be produced when the DMD 31 is horizontally moved. FIG. 14 is a plan view illustrating the direction of a Lorentz force to be produced when the DMD 31 is vertically moved. FIG. 15 is a plan view illustrating the direction of a Lorentz force to be produced when the DMD 31 is rotated.

As illustrated in these figures, by producing the Lorentz force illustrated by halftone arrow A, the DMD 31 can be moved in the direction illustrated by lattice arrow B. When the DMD 31 is made to rotate, as illustrated in FIG. 15, the coils 64 are driven so that the parallel force is reversely applied to positions across the center of the DMD 31 to produce the Lorentz force.

The control of the Lorentz force for moving or rotating the DMD 31 is performed by a movement control unit (not illustrated) as one of modules to be implemented by the CPU loading the program stored in the ROM into the RAM and executing the program. The movement control unit controls energization to the coils 64 to control the Lorentz force produced between each coil 64 and the magnet 57. Therefore, the movement control unit controls the movement amount (moving distance) and the rotation amount (rotational angle) of the DMD 31.

Based on this configuration, because the DMD 31 is rotatably configured, the light passing through the light tunnel 22 needs to be projected over the whole area of the rotatable range of the DMD 31. In order to respond to this need, the light tunnel 22 is provided such that its cross-sectional shape perpendicular to a longitudinal direction of the inner surface is, for example, a square (light tunnel 221: see FIG. 16 and FIG. 17, explained later).

Figure 16:
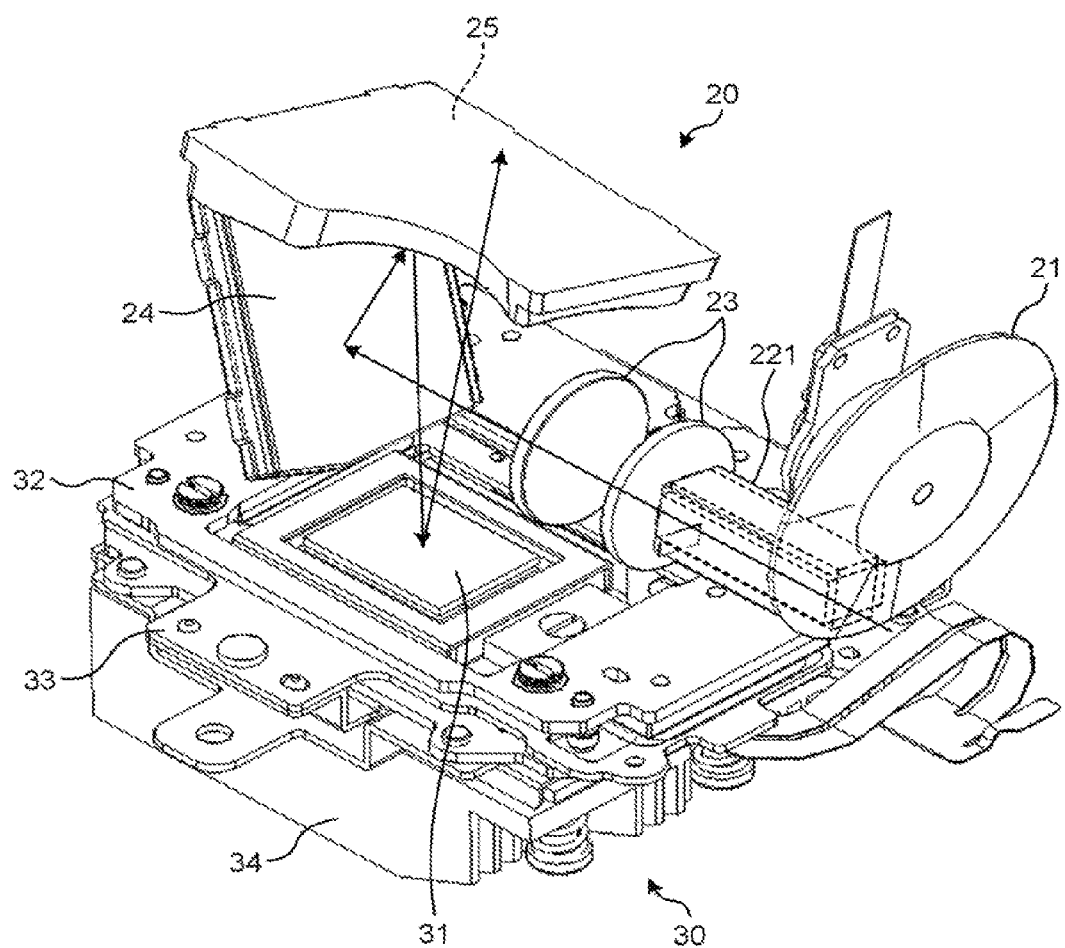
FIG. 16 is a perspective view of an illumination optical system unit illustrating a use state of a light tunnel according to the embodiment having an inner surface whose cross-sectional shape is a square.
Figure 17:
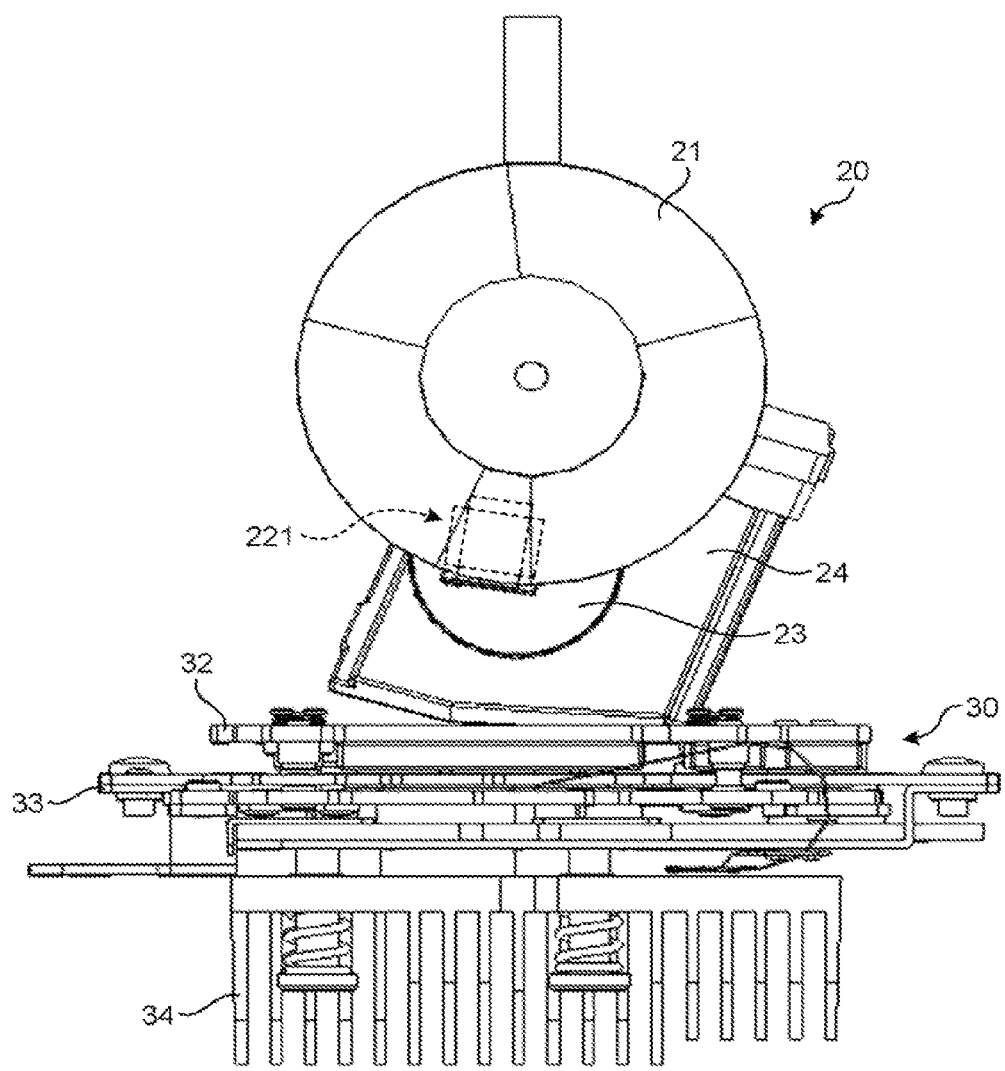
FIG. 17 is a diagram of the illumination optical system unit illustrated in FIG. 16 when viewed from a color wheel side.
Figure 18:
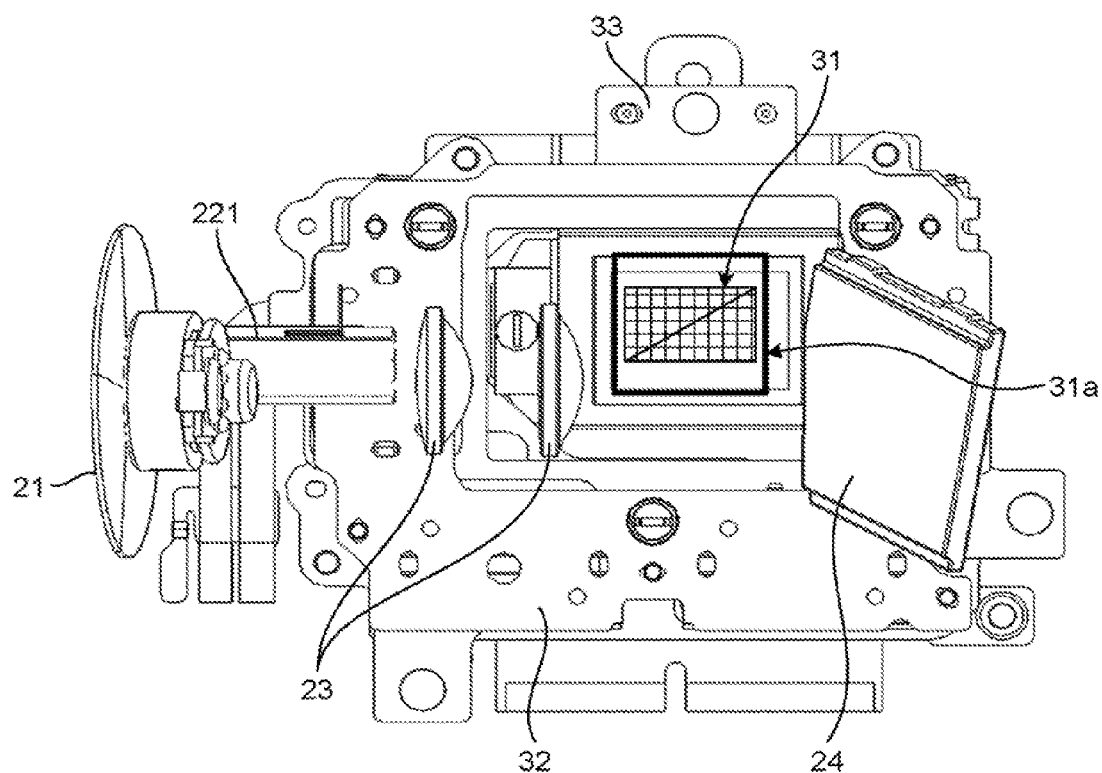
FIG. 18 is a diagram of an area where light projected by the illumination optical system unit illustrated in FIG. 16 illuminates the DMD and its surroundings.

FIG. 16 is a perspective view of the illumination optical system unit 20 illustrating a use state of the light tunnel 221 having an inner surface whose cross-sectional shape is a square. FIG. 17 is a diagram of the illumination optical system unit 20 illustrated in FIG. 16 when viewed from the color wheel 21 side. FIG. 18 is a diagram of an area (illumination area) 31a where the light projected by the illumination optical system unit 20 illustrated in FIG. 16 illuminates the DMD 31 and its surroundings.

The light emitted from the light source unit 13 and passing through the light tunnel 221 and its subsequent optical system (the relay lens 23, the cylinder mirror 24, and the concave mirror 25) illuminates the DMD 31 and a predetermined illumination area 31a around the DMD 31. An outline of the illumination area 31a formed by the light passing through the light tunnel 221 is a square. In the present embodiment, the length of one side of the square is equal to or longer than the diagonal length of the DMD 31.

"Equal to or longer than the diagonal length of the DMD 31" is a value obtained by multiplying the diagonal length by a predetermined margin. For example, when the margin is 1, the illumination area 31a is a square in which the length of one side is equal to the diagonal length of the DMD 31. For example, when the margin is 1.1, the length of one side of the illumination area 31a is 10% longer than the diagonal length.

Thus, even if the DMD 31 is rotated, for example, 90° and the screen is changed from a horizontally long screen to a vertically long screen, the DMD 31 will not deviate from the illumination area 31a, which makes it possible to perform excellent image generation.

Modifications of Embodiment

Figure 19:
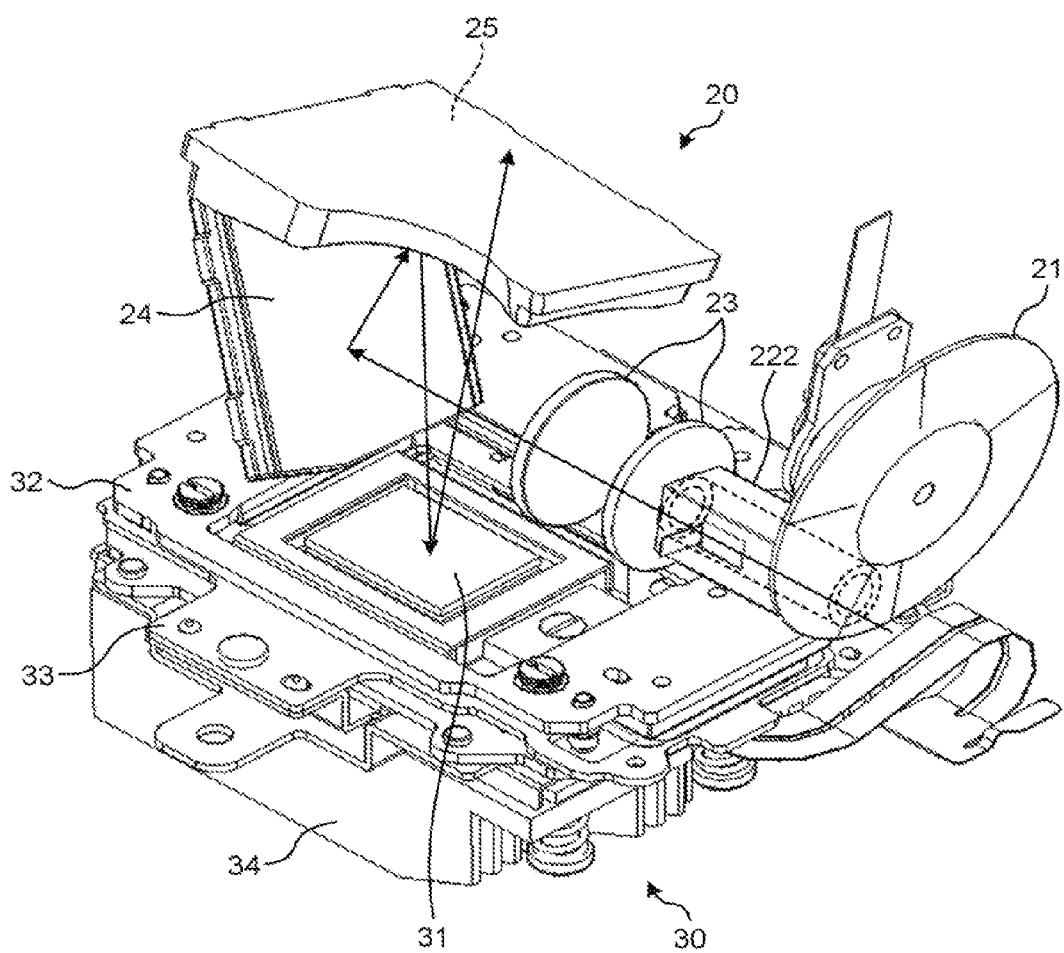
FIG. 19 is a perspective view of the illumination optical system unit illustrating a use state of a light tunnel according to a modification of the embodiment having an inner surface whose cross-sectional shape is a circle.
Figure 20:
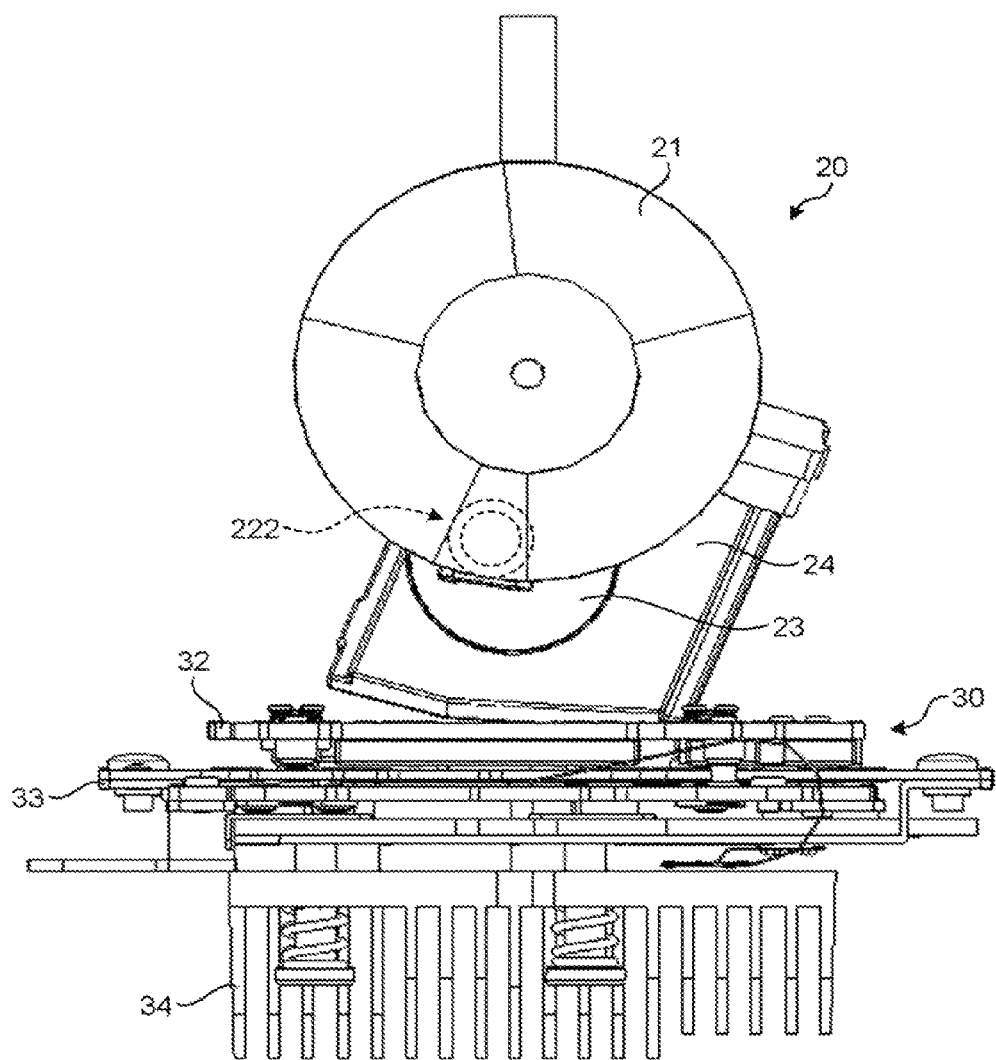
FIG. 20 is a diagram of the illumination optical system unit illustrated in FIG. 19 when viewed from the color wheel side.
Figure 21:
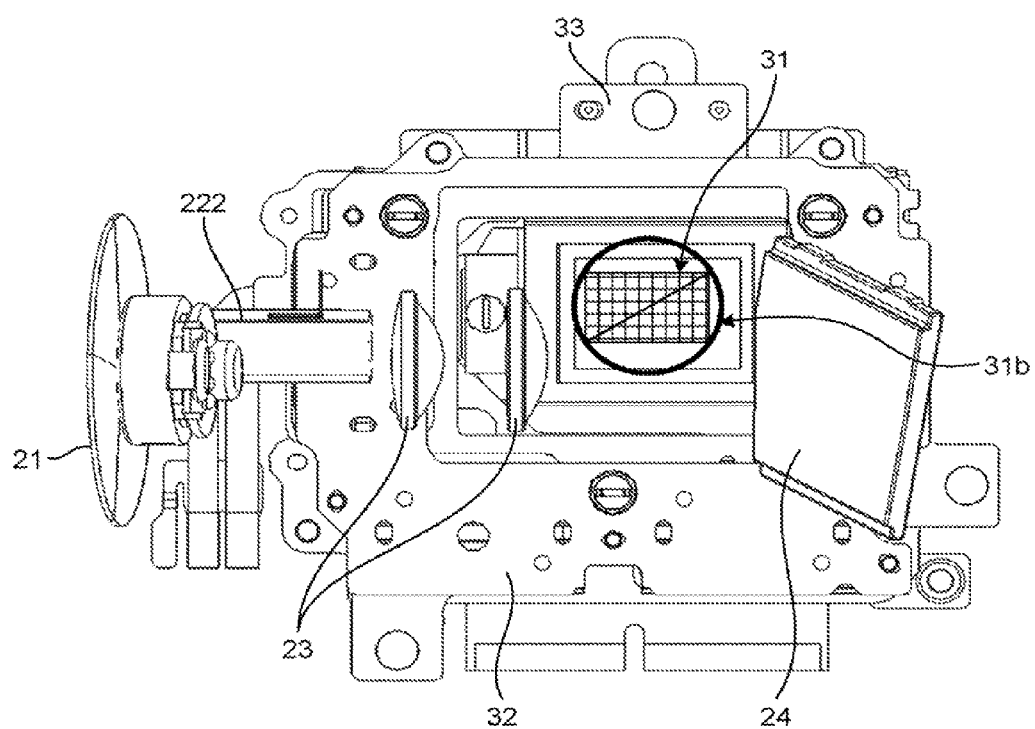
FIG. 21 is a diagram of an area where light projected by the illumination optical system unit illustrated in FIG. 19 illuminates the DMD and its surroundings.

In the embodiment, a light tunnel 222 whose cross section is a circle may be used instead of the light tunnel 221. FIG. 19 is a perspective view of the illumination optical system unit 20 illustrating a use state of the light tunnel 222 having an inner surface whose cross-sectional shape is a circle. FIG. 20 is a diagram of the illumination optical system unit 20 illustrated in FIG. 19 when viewed from the color wheel 21 side. FIG. 21 is a diagram of an area (illumination area) 31b where the light projected by the illumination optical system unit 20 illustrated in FIG. 19 illuminates the DMD 31 and its surroundings.

The light emitted from the light source unit 13 and passing through the light tunnel 222 and its subsequent optical system (the relay lens 23, the cylinder mirror 24, and the concave mirror 25) illuminates the DMD 31 and a predetermined illumination area 31b around the DMD 31. An outline of the illumination area 31b formed by the light passing through the light tunnel 222 is a circle. In the present embodiment, the length of the diameter of the circle is equal to or longer than the diagonal length of the DMD 31.

"Equal to or longer than the diagonal length of the DMD 31" is a value obtained by multiplying the diagonal length by a predetermined margin. For example, when the margin is 1, the illumination area 31b is a circle in which the length of the diameter is equal to the diagonal length of the DMD 31. For example, when the margin is 1.1, the diameter of the illumination area 31b is 10% longer than the diagonal length.

Thus, even if the DMD 31 is rotated, for example, 90° and the screen is changed from a horizontally long screen to a vertically long screen, the DMD 31 will not deviate from the illumination area 31b, which makes it possible to perform excellent image generation.

In the embodiment and the modifications, the specific examples (tubes with square and circular cross-sections) of the shape of the light tunnel 22 has been described; however, the embodiments are not limited thereto upon implementation. For example, if the rotatable range of the DMD 31 is less than 90°, it may be a tube whose cross section is an outline of movement trajectory when the DMD 31 is rotationally moved over the entire area of the rotatable range, or may be a tube whose cross section is an oval close to the outline of the movement trajectory.

In the embodiment and the modifications, the margin has been described; however, as illustrated in FIG. 13 and FIG. 14, the DMD 31 can be moved from side to side and back and forth, and therefore even if the margin is 1, for example, the DMD 31 can be appropriately disposed in the illumination area 31a and in the illumination area 31b. By minimizing the margin, the use efficiency of the light can be improved. In other words, the luminance on the DMD 31 can be increased.

The light tunnel 221 has advantages such as easier production than that of the light tunnel 222. The light tunnel 222 has advantages such as higher use efficiency of the light than that of the light tunnel 221.

According to the present invention, even if the image generation element is rotated, the entire surface of the image generation element enters the illumination area of the illumination optical unit without deviation. Therefore, the image generation element can be used without any trouble regardless of a rotation angle of the image generation element, thus performing excellent image projection.

Because the image generation element is rotatable, the orientation of a projection image can be changed without changing the way to place the image projection apparatus.

For example, the response to correction when the plane where the image projection apparatus is set up is tilted in a rolling direction with respect to the screen, the correction can be responded by rotation of the image generation element instead of correction of the set-up state.

When the horizontally long screen is changed to the vertically long screen, it can be responded by rotating the image generation element 90° instead of changing the set-up of the image projection apparatus (e.g., horizontal placement changed to vertical placement).

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image projection apparatus that generates an image based on image data and projects the image, comprising:
   an image generation element that uses light emitted from a light source to generate an image;
   a holding unit that rotatably holds the image generation element;
   an illumination optical unit that includes one or more optical systems and a light tunnel that is a tubular member surrounding part of a light path from the light source to the image generation element and reflects the light by an inner surface thereof, and that projects the light passing through the light tunnel toward an entire area of a rotatable range of the image generation element; and
   a fixing unit which supports the holding unit and assists in movement of the holding unit, wherein
   the image generation element is a rectangle,
   the light tunnel has an inner surface whose cross-sectional shape is a square of which longitudinal side and transverse side are equal,
   the illumination optical unit illuminates an illumination area having a shape of a square of which longitudinal side and transverse side are equal, a length of one side of the square of the illumination area is equal to or longer than a diagonal length of the rectangle, the fixing unit includes a top plate, a base plate, and a magnet, the holding unit includes a movable plate, a coupling plate, and a coil, the fixing unit and the holding unit are superposed such that the coupling plate, the base plate, the movable plate, and the top plate are arranged in order from top to bottom, the coupling plate being fixed to the movable plate with the base plate therebetween, the top plate includes a central hole and the magnet is arranged along the central hole, the coil is provided on a top side of the movable plate at a position opposite of the magnet, and the movable plate is displaced with respect to the top plate in response to a Lorentz force produced between the magnet and a coil.

2. The image projection apparatus according to claim 1, wherein the illumination optical unit includes a relay lens which converges the light emitted from the light tunnel and corrects a chromatic aberration on an axis of the light, the relay lens being disposed between the light tunnel and the image generation unit.

3. The image projection apparatus according to claim 2, wherein the illumination optical unit includes a cylinder mirror and a concave mirror which reflect the light emitted from the relay lens to the image generation unit.

4. The image projection apparatus according to claim 1, wherein the top plate and the base plate each include a supporting hole through which a holding member is inserted, and a sphere is positioned between the movable plate and the supporting hole of the base plate.

5. The image projection apparatus according to claim 1, wherein a support is positioned between the top plate and the base plate to form a predetermined interval therebetween.

* * * * *